(12) United States Patent
Yang et al.

(10) Patent No.: US 12,096,044 B2
(45) Date of Patent: Sep. 17, 2024

(54) ADAPTIVE CODING AND STREAMING OF MULTI-DIRECTIONAL VIDEO

(71) Applicant: Apple Inc., Cupertino, CA (US)

(72) Inventors: Xiaohua Yang, San Jose, CA (US); Alexandros Tourapis, Milpitas, CA (US); Dazhong Zhang, Milpitas, CA (US); Hang Yuan, San Jose, CA (US); Hsi-Jung Wu, San Jose, CA (US); Jae Hoon Kim, San Jose, CA (US); Jiefu Zhai, San Jose, CA (US); Ming Chen, Cupertino, CA (US); Xiaosong Zhou, Campbell, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/181,261

(22) Filed: Mar. 9, 2023

(65) Prior Publication Data

US 2023/0269400 A1 Aug. 24, 2023

Related U.S. Application Data

(63) Continuation of application No. 17/188,473, filed on Mar. 1, 2021, now Pat. No. 11,627,343, which is a
(Continued)

(51) Int. Cl.
*H04N 19/90* (2014.01)
*G06F 3/01* (2006.01)
(Continued)

(52) U.S. Cl.
CPC ............. *H04N 19/90* (2014.11); *G06F 3/013* (2013.01); *H04N 19/52* (2014.11); *H04N 19/597* (2014.11); *H04N 21/234345* (2013.01)

(58) Field of Classification Search
CPC ........ G06F 3/013; H04N 19/00; H04N 19/52; H04N 19/597; H04N 19/90;
(Continued)

(56) References Cited

U.S. PATENT DOCUMENTS 7,091,928 B2  8/2006 Rajasingham
8,184,069 B1  5/2012 Rhodes
(Continued)

FOREIGN PATENT DOCUMENTS

CN  107439010 A  12/2017
EP  3406310 A1  11/2018
(Continued)

OTHER PUBLICATIONS

International Patent Application No. PCT/US2019/060238; Int'l Search Report and the Written Opinion; dated Jul. 3, 2020; 19 pages.
(Continued)

*Primary Examiner* — Anner N Holder
(74) *Attorney, Agent, or Firm* — BakerHostetler

(57) ABSTRACT

In communication applications, aggregate source image data at a transmitter exceeds the data that is needed to display a rendering of a viewport at a receiver. Improved streaming techniques that include estimating a location of a viewport at a future time. According to such techniques, the viewport may represent a portion of an image from a multi-directional video to be displayed at the future time, and tile(s) of the image may be identified in which the viewport is estimated to be located. In these techniques, the image data of tile(s) in which the viewport is estimated to be located may be requested at a first service tier, and the other tile in which the viewport is not estimated to be located may be requested at a second service tier, lower than the first service tier.

18 Claims, 11 Drawing Sheets

Related U.S. Application Data continuation of application No. 16/204,792, filed on Nov. 29, 2018, now Pat. No. 10,939,139.

(51) Int. Cl.
*H04N 19/52* (2014.01)
*H04N 19/597* (2014.01)
*H04N 21/2343* (2011.01)

(58) Field of Classification Search
CPC ..... H04N 21/234345; H04N 21/23439; H04N 21/44218; H04N 21/4728; H04N 21/631; H04N 21/6587; H04N 21/816; H04N 21/84; H04N 21/8456
See application file for complete search history.

(56) References Cited

U.S. PATENT DOCUMENTS

| | | |
|---|---|---|
| 9,940,518 B1 | 4/2018 | Klingstrom et al. |
| 10,419,738 B1 | 9/2019 | Phillips et al. |
| 2004/0136590 A1 | 7/2004 | Brouwer |
| 2004/0207635 A1 | 10/2004 | Miller et al. |
| 2008/0181498 A1 | 7/2008 | Swenson et al. |
| 2014/0199043 A1 | 7/2014 | Guntur et al. |
| 2015/0156520 A1 | 6/2015 | Thakkar et al. |
| 2015/0229990 A1 | 8/2015 | Garza et al. |
| 2015/0288923 A1 | 10/2015 | Kim et al. |
| 2016/0012855 A1 | 1/2016 | Krishnan |
| 2016/0103907 A1 | 4/2016 | Bingham et al. |
| 2016/0133201 A1 | 5/2016 | Border et al. |
| 2016/0352791 A1 | 12/2016 | Adams et al. |
| 2017/0223083 A1 | 8/2017 | Maze et al. |
| 2017/0280126 A1 | 9/2017 | Van Der Auwera et al. |
| 2017/0324951 A1 | 11/2017 | Raveendran et al. |
| 2017/0339415 A1 | 11/2017 | Wang et al. |
| 2017/0347026 A1 | 11/2017 | Hannuksela |
| 2018/0004285 A1 | 1/2018 | Castleman |
| 2018/0007422 A1 | 1/2018 | Castleman |
| 2018/0049221 A1 | 2/2018 | Park et al. |
| 2018/0181196 A1 | 6/2018 | Lee et al. |
| 2018/0341323 A1 | 11/2018 | Mate et al. |
| 2019/0174125 A1 | 6/2019 | Ninan |
| 2019/0356894 A1 | 11/2019 | Oh et al. |
| 2019/0387224 A1 | 12/2019 | Phillips et al. |
| 2020/0149864 A1 | 5/2020 | Kinrot et al. |

FOREIGN PATENT DOCUMENTS

| | | |
|---|---|---|
| GB | 2557416 A | 6/2018 |
| WO | WO 2017/188714 A1 | 11/2017 |
| WO | WO 2017/205794 A1 | 11/2017 |
| WO | WO 2018/011054 A1 | 1/2018 |
| WO | WO 2018/049221 A1 | 3/2018 |
| WO | WO 2018/136301 A1 | 7/2018 |

OTHER PUBLICATIONS

Corbillon et al.; "Viewport-Adaptive Navigable 360-Degree Video Delivery"; ACM MMYSys; May 2016; 58 pages.

International Patent Application No. PCT/US2019/060238; Invitation to Pay Add] Fees; dated Mar. 26, 2020; 31 pages.

Li et al.; "Very Long Term Field of View Prediction for 360-degree Video Streaming"; Dept. of Electrical and Computer Engineering, Tandon School of Engineering, New York University; Feb. 2019; 6 pages.

International Patent Application No. PCT/US2019/060238; Int'l Written Opinion; dated Oct. 30, 2020; 12 pages.

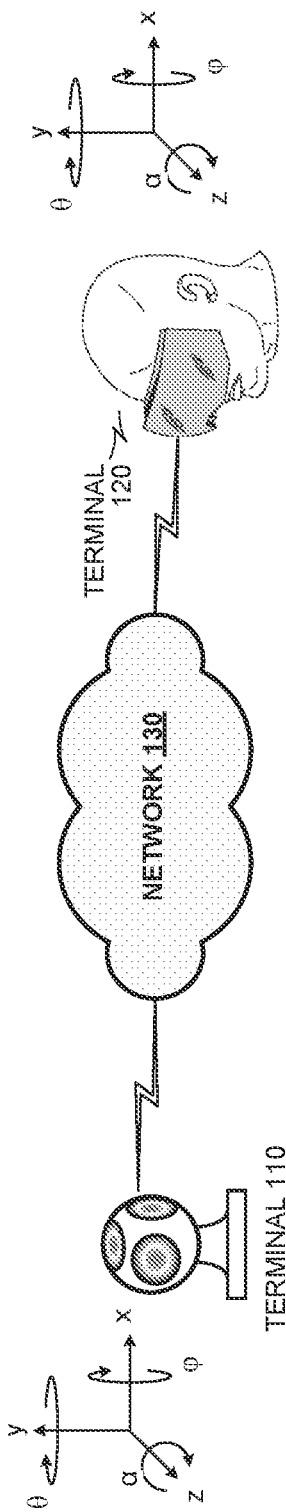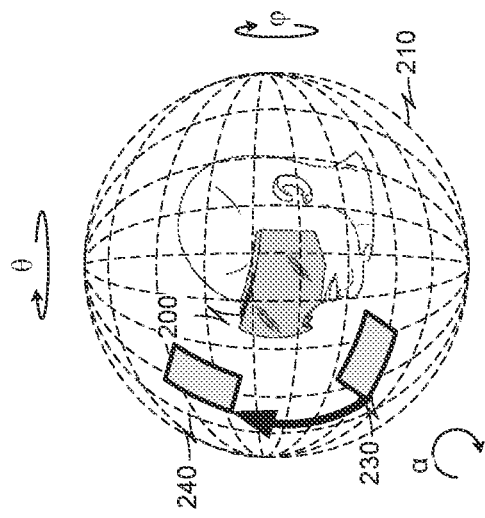
FIG. 1
100
FIG. 2

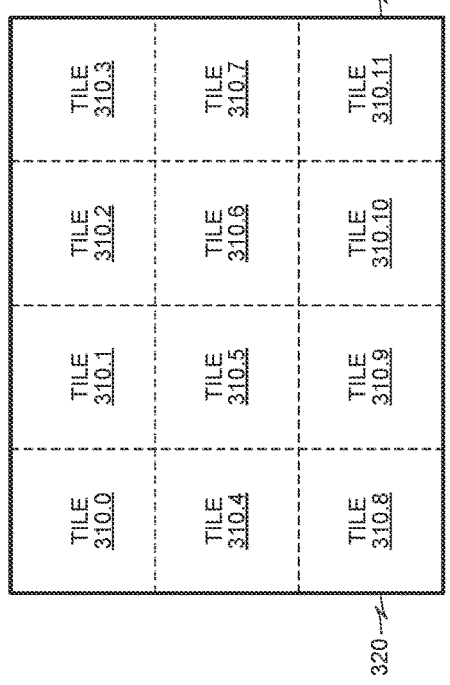
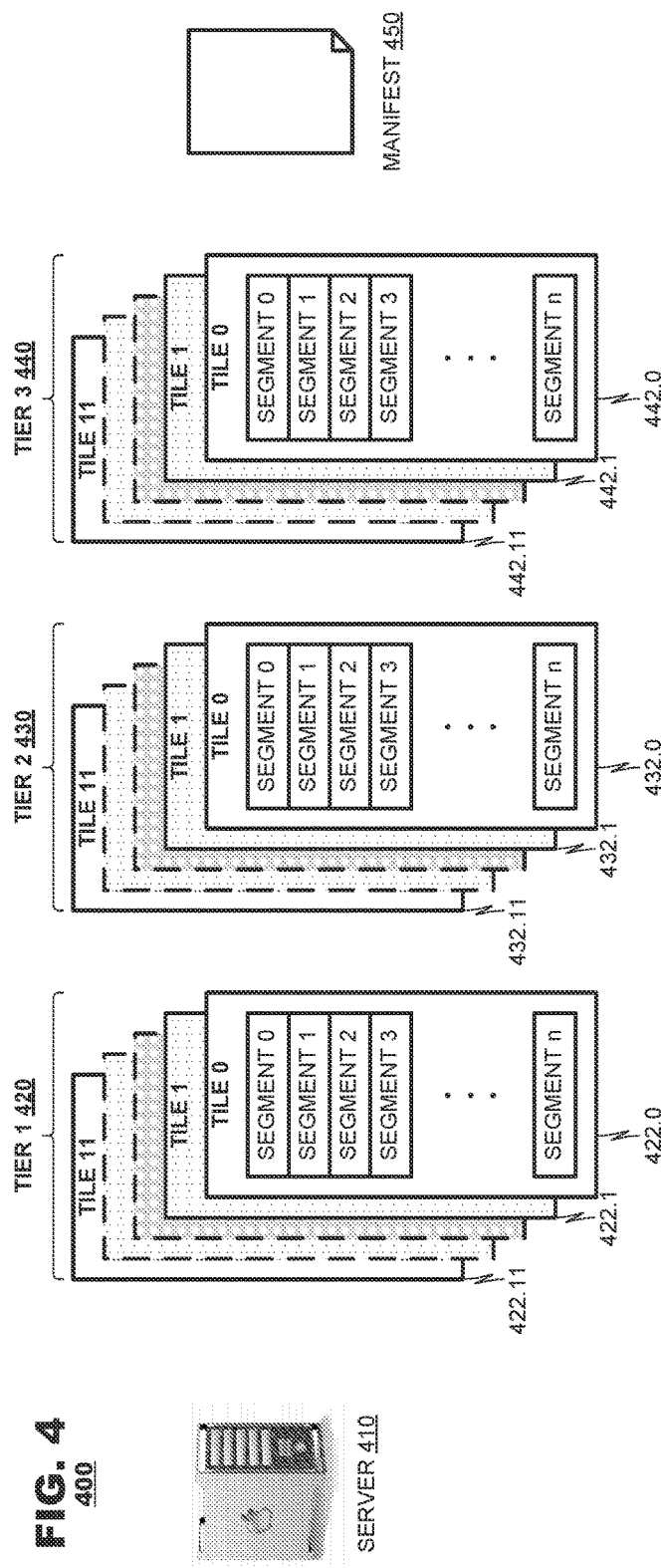

500

550

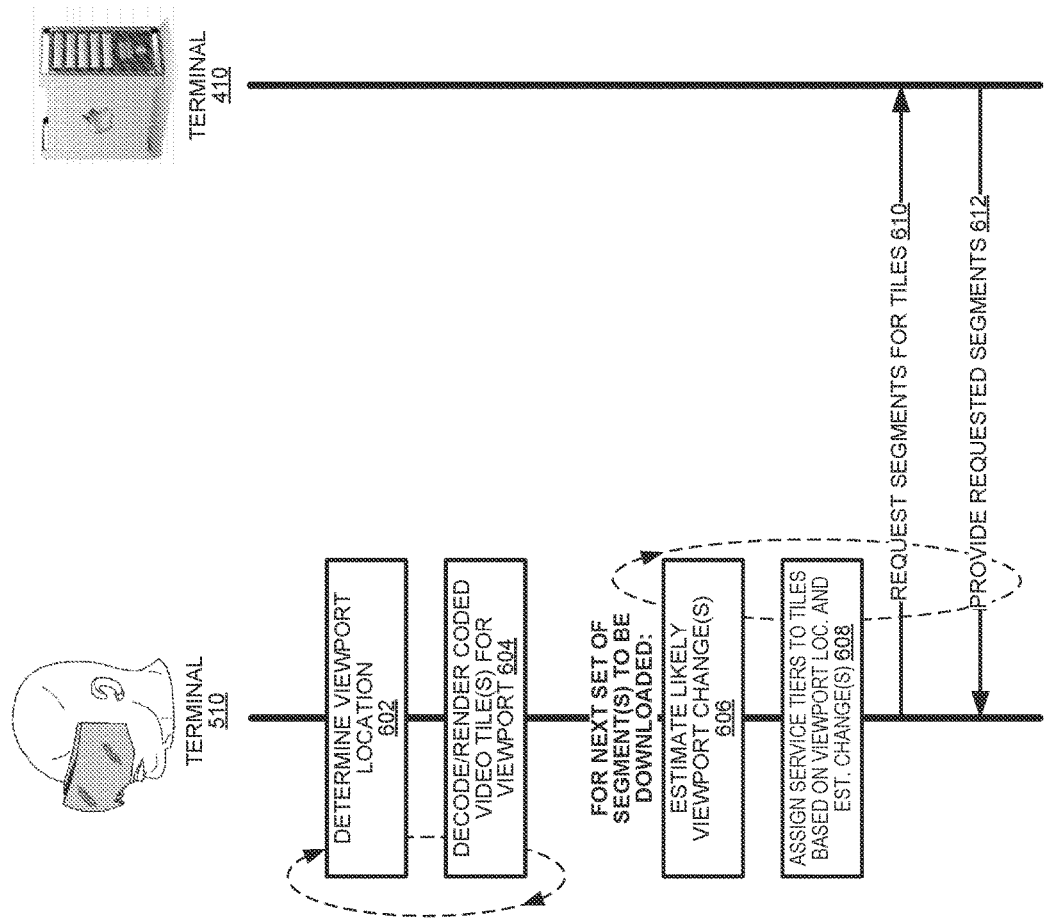

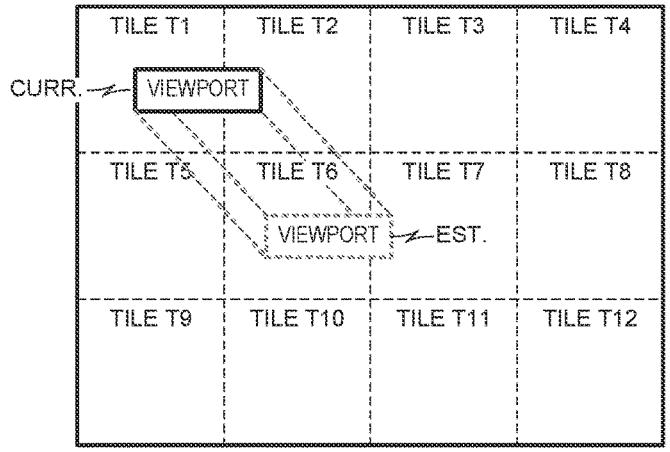
FIG. 7
700
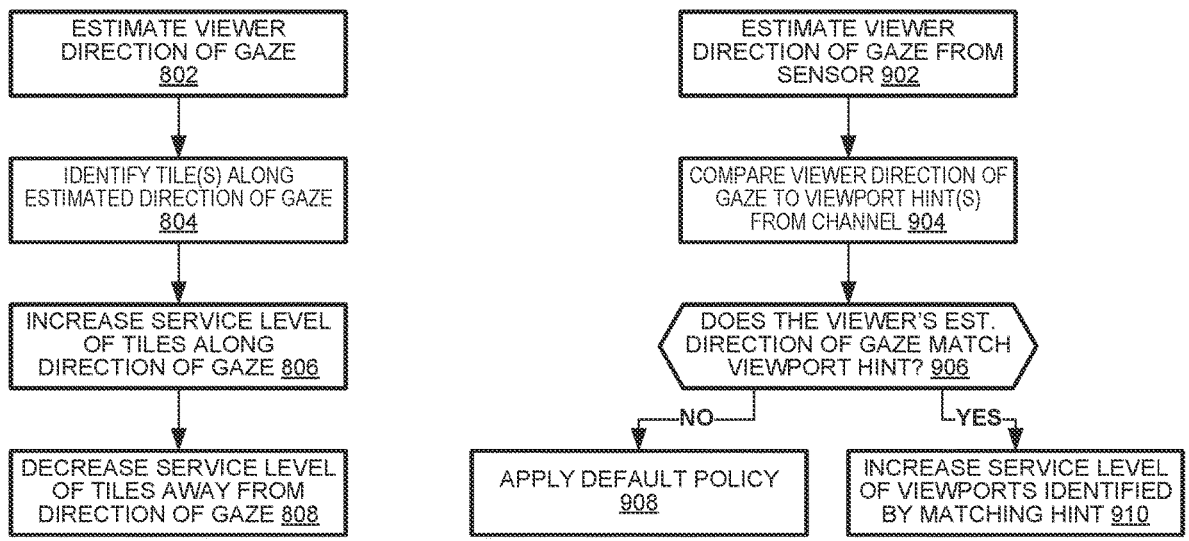
FIG. 8
800
FIG. 9
900

1100

1000

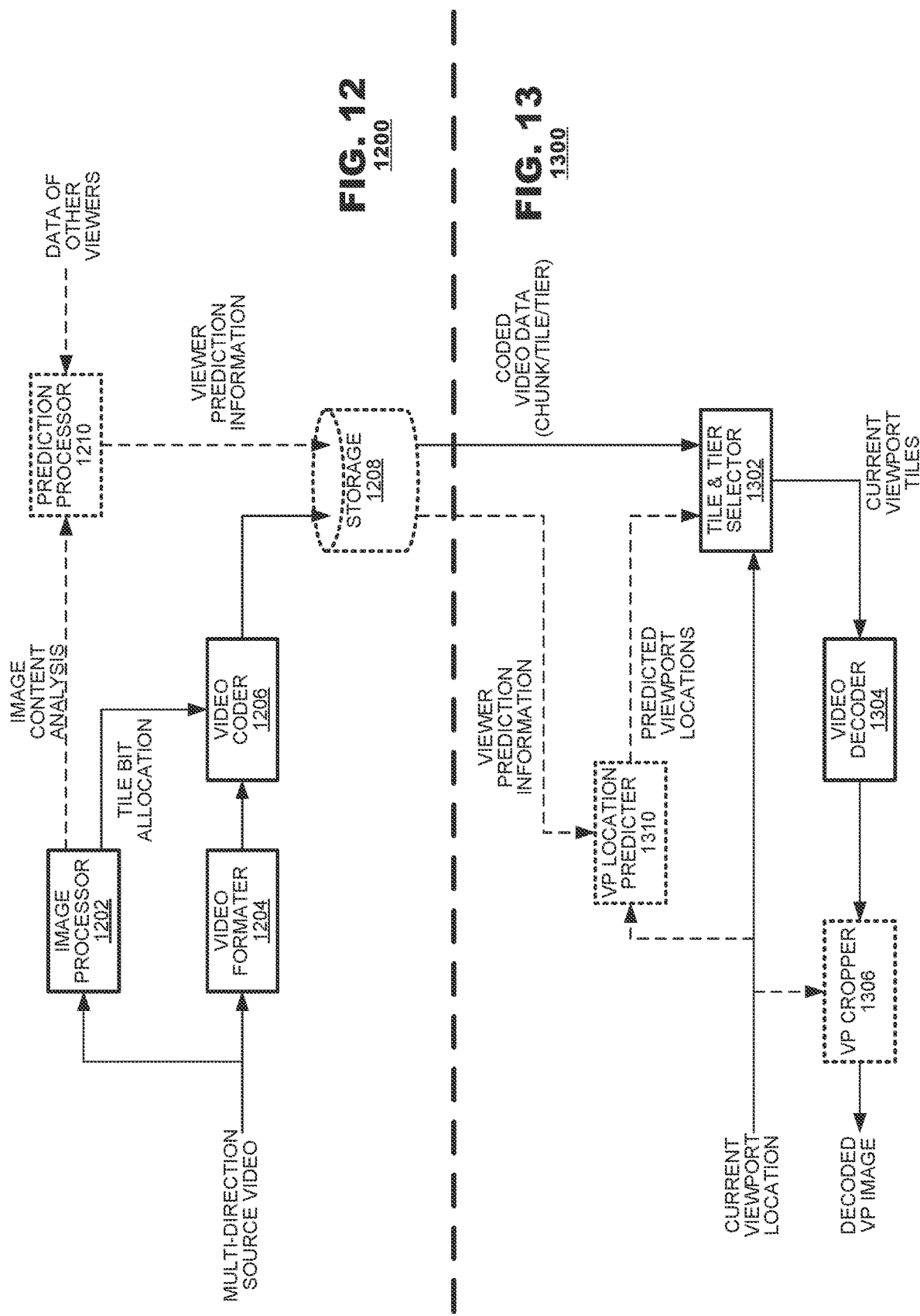

1500

1400

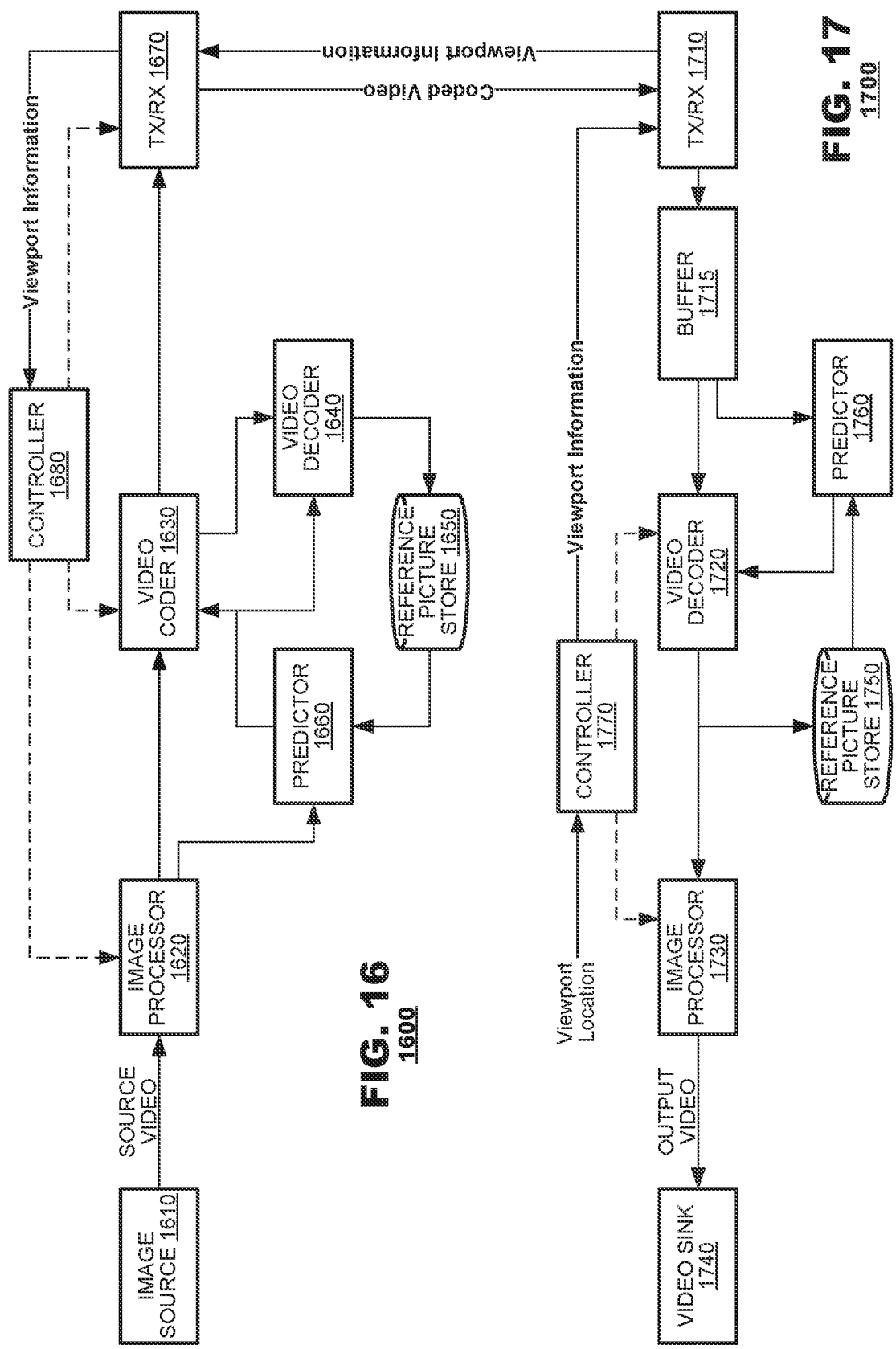

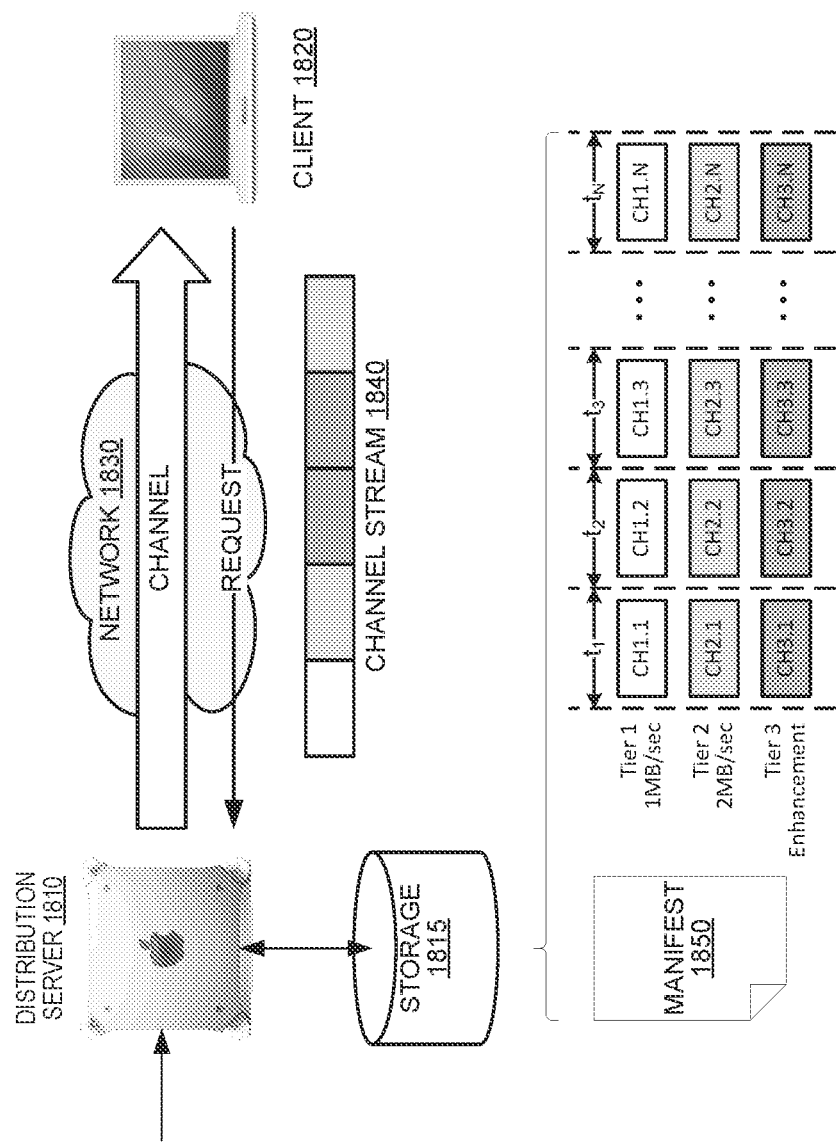

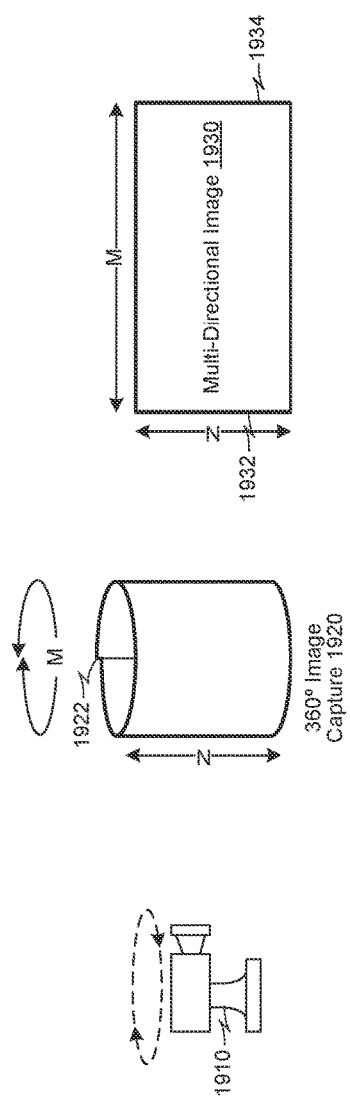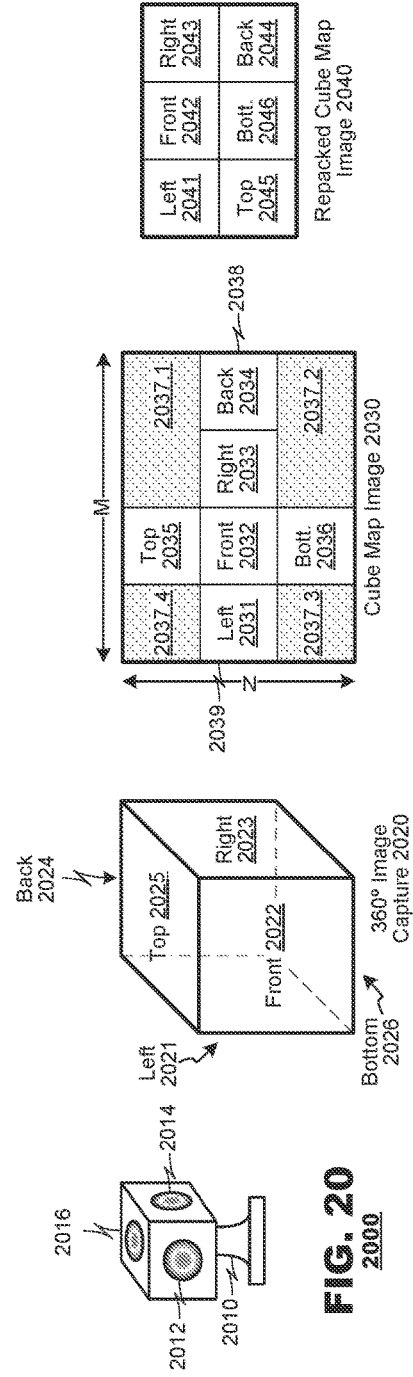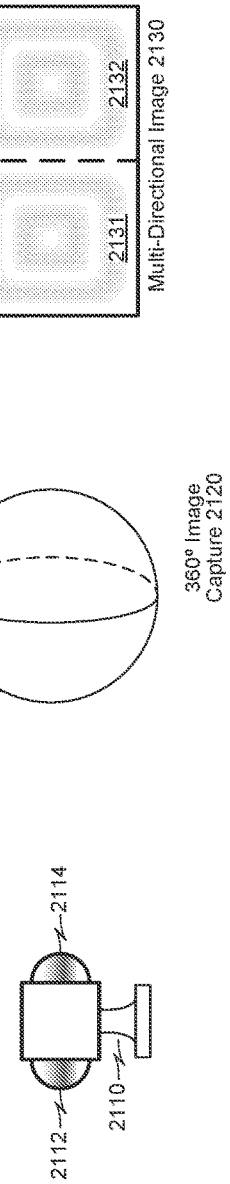

ADAPTIVE CODING AND STREAMING OF MULTI-DIRECTIONAL VIDEO

CROSS REFERENCE TO RELATED APPLICATIONS

This application is a continuation of U.S. patent application Ser. No. 17/188,473 filed Mar. 1, 2021, which is a continuation of application Ser. No. 16/204,792 filed on Nov. 29, 2018, the entire contents are incorporated herein by reference.

BACKGROUND

The present disclosure relates to video coding techniques.

Some modern imaging applications capture image data from multiple directions about a camera. Some cameras pivot during image capture, which allows a camera to capture image data across an angular sweep that expands the camera's effective field of view. Some other cameras have multiple imaging systems that capture image data in several different fields of view. In either case, an aggregate image may be created that merges image data captured from these multiple views (often called "360 degree" or omnidirectional images).

A variety of rendering applications are available for multi-directional content. One rendering application involves extraction and display of a subset of the content contained in a multi-directional image. For example, a viewer may employ a head mounted display and change the orientation of the display to identify a portion of the multi-directional image in which the viewer is interested. Alternatively, a viewer may employ a stationary display and identify a portion of the multi-directional image in which the viewer is interested through user interface controls. In these rendering applications, a display device extracts a portion of image content from the multi-directional image (called a "viewport" for convenience) and displays it. The display device would not display other portions of the multi-directional image that are outside an area occupied by the viewport.

BRIEF DESCRIPTION OF THE DRAWINGS

FIG. 1 illustrates a system according to an aspect of the present disclosure.

FIG. 2 figuratively illustrates a rendering application for a sink terminal according to an aspect of the present disclosure.

FIG. 3 illustrates an exemplary partitioning scheme in which a frame is partitioned into non-overlapping tiles.

FIG. 4 illustrates a server that stores an exemplary set of coded video data.

FIG. 6 illustrates a method according to an aspect of the present disclosure.

FIG. 7 illustrates an example moving viewport according to an aspect of the present disclosure.

FIG. 8 illustrates a method according to an aspect of the present disclosure.

FIG. 9 illustrates a method according to an aspect of the present disclosure.

FIG. 12 illustrates a system for coding tiled video according to an aspect of the present disclosure.

FIG. 13 illustrates a system for selecting tiles and tiers from a pre-coded video stream for a viewport location according to an aspect of the present disclosure.

FIG. 16 is a functional block diagram of a coding system according to an aspect of the present disclosure.

FIG. 17 is a functional block diagram of a decoding system according to an aspect of the present disclosure FIG. 18 is a simplified block diagram of an example video distribution system.

FIG. 19 illustrates an exemplary multi-directional image projection format according to one aspect.

FIG. 20 illustrates an exemplary multi-directional image projection format according to another aspect.

FIG. 21 illustrates another exemplary multi-directional projection image format.

DETAILED DESCRIPTION

Figure 5A:
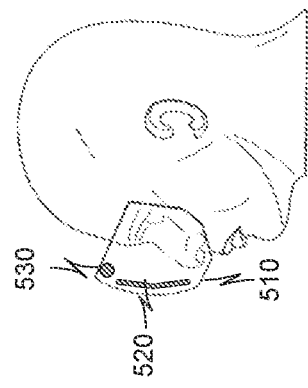
FIG. 5A illustrates an example rendering device according to an aspect of the present disclosure.

In communication applications, aggregate source image data at a transmitter exceeds the data that is needed to display a rendering of a viewport at a receiver. Improved streaming techniques may include estimating a location of a viewport at a future time. Improved coding techniques may include adapting a bit allocation amongst independently coded subareas, e.g. tiles, of source image data. Additional improved streaming techniques may include determining a tier and tile selection of pre-encoded source image data that may be adapted to movement of a viewport.

Aspects of the present disclosure provide techniques that include estimating a location of a viewport at a future time. According to such techniques, the viewport may represent a portion of an image from a multi-directional video to be displayed at the future time, and tile(s) of the image may be identified in which the viewport is estimated to be located. In these techniques, the image data of tile(s) in which the viewport is estimated to be located may be requested at a first service tier, and the other tile in which the viewport is not estimated to be located may be requested at a second service tier, lower than the first service tier.

Aspects of the present disclosure provide techniques that include adapting a bit allocation amongst tiles of source image data. A multi-directional video stream may be parsed spatially into independently coded areas, which may be referred to herein as tiles, and divided in time into chunks. The image content of the tiles in a chunk may be analyzed to determine a bit allocation strategy amongst the tiles within the chunk such that a quality metric for all tiles is similar. The tiles of the chunk may then be coded independently of each other. In some aspects, the tiles may be coded with a multi-tier coding protocol where a single tile may be coded at multiple tiers of quality or bitrate. In some aspects, the analysis and coding may be repeated for other chunks of the video.

Aspects of the present disclosure provide techniques for selecting a tier collection when a viewport moves. According to such techniques, a first tier collection may be selected for a currently viewport location of multi-directional video stream, where a tier collection is a first list of tiles with corresponding tiers, including viewport tiles at a current viewport tier that include the viewport location and non-viewport tiles at a non-viewport tier that includes tiles that do not include the current viewport location. When the aggregate size of compressed video data exceeds a threshold, a new tier collection may be selected, and transmission may be requested of the new tier collection. For example, when the aggregate size for the first tier collection is above a high threshold, a reduced tier collection may be selected including the first list of tiles and corresponding reduced tiers, wherein each of the corresponding reduced tiers is lower than or equal to its corresponding first tier in the first collection. In another example, when the aggregate size of compressed video data for the first tier collection is below another, low threshold, an increased tier collection may be selected including the first list of tiles and corresponding increased tiers, wherein each of the corresponding increased tiers is higher than or equal to its corresponding first tier in the first collection. FIG. 1 illustrates a system 100 according to an aspect of the present disclosure. There, the system 100 is shown as including a source terminal 110 and a sink terminal 120 interconnected by a network 130. The source terminal 110 may transmit a coded representation of omni-directional video to the sink terminal 120. The sink terminal 120 may receive the coded video, decode it, and display a selected portion of the decoded video.

FIG. 1 illustrates the source terminal 110 as a multi-directional camera that captures image data of a local environment before coding it. In another aspect, the source terminal 110 may receive omni-directional video from an external source (not shown), such as a streaming service or storage device.

The sink terminal 120 may determine a viewport location in a three-dimensional space represented by the multi-directional image. The sink terminal 120 may select a portion of decoded video to be displayed, for example, based on the terminal's orientation in free space. FIG. 1 illustrates the sink terminal 120 as a head mounted display but, in other aspects, the sink terminal 120 may be another type of display device, such as a stationary flat panel display, smartphone, tablet computer, gaming device, or portable media player. Different types of user controls may be provided with each such display type through which a viewer identifies the viewport. The sink terminal's device type is immaterial to the present discussion unless otherwise noted herein.

The network 130 represents any number of computer and/or communication networks that extend from the source terminal 110 to the sink terminal 120. The network 130 may include one or a combination of circuit-switched and/or packet-switched communication networks. The network 130 may communicate data between the source terminal 110 and the sink terminal 120 by any number of wireline and/or wireless communication media. The architecture and operation of the network 130 is immaterial to the present discussion unless otherwise noted herein.

FIG. 1 illustrates a communication configuration in which coded video data is transmitted in a single direction from the source terminal 110 to the sink terminal 120. Aspects of the present disclosure find application with communication equipment that exchange coded video data in a bidirectional fashion, from terminal 110 to terminal 120 and also from terminal 120 to terminal 110. The principles of the present disclosure find application with both unidirectional and bidirectional exchange of video.

FIG. 2 figuratively illustrates a rendering application for a sink terminal 200 according to an aspect of the present disclosure. There, omni-directional video is represented as if it exists along a spherical surface 210 provided about the sink terminal 200. Based on the orientation of the sink terminal 200, the terminal 200 may select a portion of the video (called, a "viewport" for convenience) and display the selected portion. As the orientation of the sink terminal 200 changes, the terminal 200 may select different portions from the video. For example, FIG. 2 illustrates the viewport changing from a first location 230 to a second location 240 along the surface 210.

Aspects of the present disclosure may apply video compression techniques according to any of a number of coding protocols. For example, the source terminal 110 (FIG. 1) may code video data according to an ITU-T/ISO MPEG coding protocol such as H.265 (HEVC), H.264 (AVC), and the upcoming H.266 (VVC) standard, an AOM coding protocol such as AV1, or a predecessor coding protocol. Typically, such protocols parse individual frames of video into spatial arrays of video, called "pixel blocks" herein, and may code the pixel blocks in a regular coding order such as a raster scan order.

In an aspect, individual frames of multi-directional content may be parsed into individual spatial regions, herein called "tiles", and coded as independent data streams. FIG. 3 illustrates an exemplary partitioning scheme in which a frame 300 is partitioned into non-overlapping tiles 310.0-310.11. In a case where the frame 300 represents omni-directional content (e.g., it represents image content in a perfect 360° field of view, the image content will be continuous across opposing left and right edges 320, 322 of the frame 300).

In an aspect, the tiles described here may be a special case of the tiles used in some standards, such as HEVC. In this aspect, the tiles used herein may be "motion constrained tile sets," where all frames are segmented using the exact same tile partitioning, and each tile in every frame is only permitted to use prediction from co-located tiles in other frames. Filtering inside the decoder loop may also be disallowed across tiles, providing decoding independency between tiles. Filtering may still be permitted outside the decoder loop.

FIG. 4 illustrates a server 410 that stores an exemplary set of coded video data, in an aspect, corresponding to a tiled image as shown in FIG. 3. As discussed, a multi-directional image 300 may be parsed into a plurality of tiles 310.0-310.11 representing different spatial regions of the image 300. Each of the tiles 310.0-310.11 may be coded at different quality "tiers" 420, 430, 440. The tiers may distinguish each other by representing their respective tiles at different levels of coding quality, different coding bit rates, or the like.

Each tile may be parsed temporally into a plurality of segments (segments 0-n are shown in the example of FIG. 4). Each segment may contain coded video data representing its respective tier over a predetermined span of time. Although not necessary, each segment may represent a common amount of time (for example, 5 seconds, 10 seconds, or the like). The segments may terminate at common points in time, which permits video delivery of a single tile (say, tile 0) to be delivered at a first quality tier (say, tier 430), then change to another quality tier (say, tier 440) at a transition between common segments. That is, segments 0-2 may be delivered from tier 430, then transition to tier 440 from which segments 3-n are delivered. Because the segments 0-n cover common temporal spans across each tier 420, 430, and 440, the segments define permissible transition points between the tiers 420-440.

The server 410 also may store a manifest 450 that stores data identifying the tiers 420-440, the tiles 0-11 and the segments therein that are available for download to client devices. The manifest 450 typically stores descriptive information about the tiers, tiles, and segments such as their spatial sizes, data rates, times, and network identifiers from which each segment may be downloaded. Typically, a server 410 will furnish the manifest 450 to a client device and the client device will select segment(s) for download based upon review of the manifest 450.

In an aspect, the tiers of coded video data in FIG. 4 may be differentiated from each other in various ways. For example, tier 420 may be a higher quality tier than tier 430 or 440 as measured by an objective or subjective quality metric. A coding quality metric may compare a source input video to coded video, for example by measuring mean-squared error (MSE), a peak signal-to-noise ratio (PSNR), a video multimethod assessment fusion (VMAF) metric, a structural similarity (SSIM) index, a metric that accounts for temporal errors such as a video quality metric (VQM). A subjective quality metric may include manual viewer ratings of different tiers.

FIG. 5A illustrates an example rendering device 510 according to an aspect of the present disclosure. In FIG. 5A, a rendering device 510 is depicted as mounted on a viewer's head and includes a display 530 and an optional gaze location sensor 530. Display 520 may present a rendering of a viewport from multi-directional video. An optional gaze location sensor may detect a gaze location within the area of the viewport of the viewer's gaze. For example, gaze location sensor 520 may include a camera that detects the viewer's eye positions relative to the display 520 to estimate a gaze location for the viewer's eyes. Rendering device 510 may also include an optional motion sensor (not depicted) to detect movement of the viewer's head.

Figure 5B:
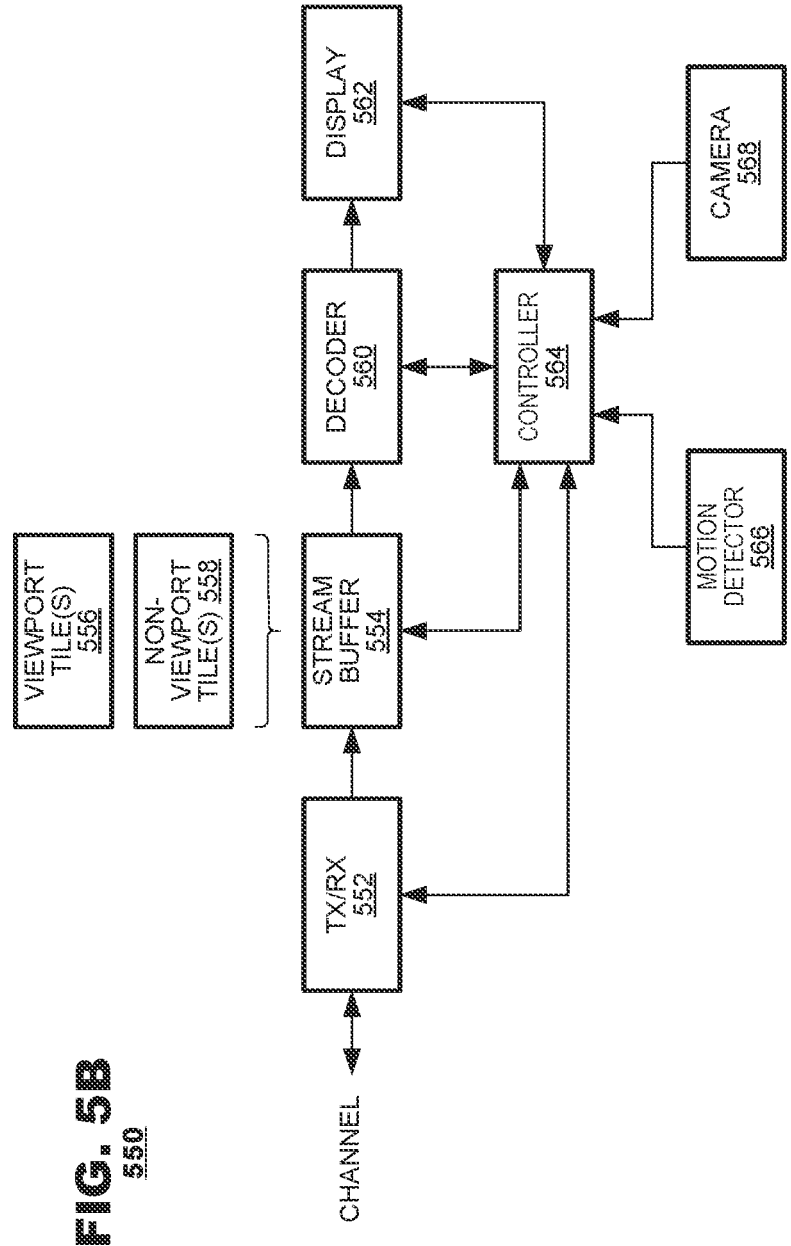
FIG. 5B illustrates a system for rendering according to an aspect of the present disclosure.

FIG. 5B illustrates a system 550 for rendering according to an aspect of the present disclosure. System 550 includes a transmitter/receiver unit 552, a stream buffer 554 containing coded image data of both viewport tiles 556 and non-viewport tiles 558, a decoder 560, display output 562, and controller 564. System 550 may also optionally include a motion detector 566 and/or a gaze sensor, such as camera 568. Transmitter/receiver 552 may send requests for segments of a multi-directional video to a communication channel, and may receive the requested segments from the channel. In an aspect, segment requests may be sent to and segment data may be received from a server such as server 410 of FIG. 4. Controller 564 may determine which tiles contain a current viewport, control decoder 560 to decode current viewport tiles 556 from stream buffer 554, and provide the decoded image content to display output 562. Display output 562 may be sent to a display, such as display 520 of FIG. 5A, to present an image of the viewport to a viewer.

In an aspect, controller 564 may determine the current viewport location based on motion sensor data. For example, a current viewport location may be determined from a motion detector 566 if motion detector 566 is on a head-mounted display. The decoded viewport tiles may be to the viewport perimeter for rendering. In another aspect, controller 564 may determine a region of interest on a stationary display from gaze location from a gaze location sensor.

In addition to determining a current viewport location, controller 564 may additional predict a future location of the viewport. For example, a direction and speed of a viewer's gaze movement may be estimated from motion detector 566 or camera 568, and a future location of a viewport may be derived from the estimated direction of gaze movement. In other aspects, a future location of a viewport may be predicted based on a viewport location hint, based on data regarding other viewers, and based on image content of the video itself. A viewport hit may be received, for example, from the source of the coded segments and indicate other viewer's gaze or viewport locations, or a preferred viewport as might be specified by artistic director or creator of the multi-directional video. Image content of the video might include location of objects in the video as determined from object analysis or recognition of the video data.

In an aspect, controller 564 may request segments of coded multi-directional video data. The requested segments may be for a current viewport location, a predicted future viewport location, and other non-viewport locations. For example, segment requests may be from a server 410 of FIG. 4 based on network location identifiers listed in the manifest 450. An example default request policy might include requesting a tile or tiles of a predicted location at a first higher quality tier, requesting tiles near the predicted location at a second lower quality tier, and not requesting any segments for tiles far from the predicted location. In another aspect, all tiers outside the predicted viewport location may be requested at the second lower quality tier. In an aspect, tiles containing a current viewport may be requested for at segments of a future rendering time at either higher or lower quality tiers than tiles of a predicted viewport location.

Viewport Prediction

FIG. 6 illustrates a method 600 according to an aspect of the present disclosure. Rendering terminal 510 may determine a current viewport location (box 602) and decode and render the coded video tiles that include the current viewport location (box 604). Boxes 602 and 604 may be repeated continuously to determine new viewport locations and decode and render the new viewport images. Likely future changes to the current viewport may be estimated (box 606), and service quality tiers may be assigned tiles based on the current viewport location and estimated changes. (box 608). Terminal 510 may request coded data segments from terminal 410 (message 610), and terminal 610 may respond by providing the requested coded data segments (message 612). Viewport changes may be estimated and requests for segment repeated continuously (boxes 606, 608, messages 610, 612). In aspects, terminal 510 may be rendering device 510 of FIG. 5A, and terminal 410 may be server 410 of FIG. 4.

FIG. 7 illustrates an example moving viewport according to an aspect of the present disclosure. In FIG. 7, multi-directional image 700 is parsed spatially into tiles T10 to T12, and a current viewport location spans tiles T1 and T2, while an estimated future viewport location spans tiles T6 and T7 after moving also through tile T5. In an example default tier-tile selection policy, segments containing the current viewport location (tiles T1 and T2) may be requested with a first tier for a highest level of service, while other tiles that include a predicted future viewport location (tiles T5, T6, and T7) may be requested with a second tier for a lower quality of service. Other tiles that do not include either current or predicted levels of service may be requested at a lowest quality of service or may not be requested at all.

FIG. 8 illustrates a method 800 according to an aspect of the present disclosure. In method 800, a direction of gaze location movement for a viewer may be estimated (box 802), and tiles along the estimated direction of gaze movement may be identified (box 804). Service quality level of requested segments may be increased for the identified tiles (box 806), while service quality level of tiles away from the estimated direction of gaze movement may be decreased (box 808).

In an aspect, the direction of gaze location movement may be based on any combination of: input from sensors at a current viewer, such as motion detector 566 and camera 568 of FIG. 5B; viewport hints, such as SEI messages embedded in encoded image data; and data regarding other viewers, such as other viewers' gaze direction or viewport location.

In an aspect, a viewport hint may be provided with image compressed data, such as in an SEI message embedded in data, and a viewport hint might specify a current or expected future location. Specified location may indicate a viewport location or a gaze location, and might include a current motion (direction and speed) of the viewport or gaze location. In some aspects the location information from the data source may be with respect to an entire multi-directional image, or the location information may be with respect to tile boundaries such as by specifying a location simply by specifying the tile(s) that include a viewport location. For example, an SEI message embedded in video data for a segment at video time T may specify the expected tile location(s) of a viewport during a future video time T+2. Such an SEI message may facilitate a receiving terminal to request transmission of a higher service level for the expected future tile location(s) before the rendering of video time T+2 is necessary. In another example, an SEI message may specify a future location preferred or expected gaze location, such as location of an individual pixel or region, and then a receiving terminal can determine the tiles that will be included in a local viewport based on the specified gaze location and the size of the local viewport.

In an aspect, viewport hint information may include the viewing habits of other viewers. Viewing habits may include a gaze or viewport location at different video times of a multi-directional video. Viewing habits may also include viewport motion, such as direct and speed, or head movements. In some aspects, viewing habits of many other users may be averaged over many users, while in other aspects, viewing habits of other viewers may be classified, for example, according to multiple statistically frequent gaze locations, or according to objects in the image content corresponding to frequent gaze locations.

In an aspect, other viewers' gaze locations may be based on a previous viewer's gaze, where the previous viewer viewed the media at a time prior to transmission to a current viewer. In another aspect, techniques presented herein may be used in a live broadcast or multicast event. Gaze locations of concurrent viewers may be estimated and used to assign service tiers for transmission. For example, gaze locations of one or more live viewer watching video prior to encoding may be detected, and then those live viewer gaze locations may be used to assign service levels for a plurality of current viewers at a plurality of network locations. In this live event aspect, additional bandwidth improvement over existing techniques includes the bandwidth optimization of the assigned service levels to multiple simultaneous network destinations for viewers.

FIG. 9 illustrates a method 900 according to an aspect of the present disclosure. In method 900, a direction of gaze location movement for a current viewer may be estimated from a sensor (box 902), which may then be compared to the hints of viewport direction received from the channel (box 904). If the estimated direction matches the viewport hint (box 906), an increased service level is required for tiles matching the viewport hint (box 910), and a default tier-tile selection policy is applied (box 908).

Figure 10:
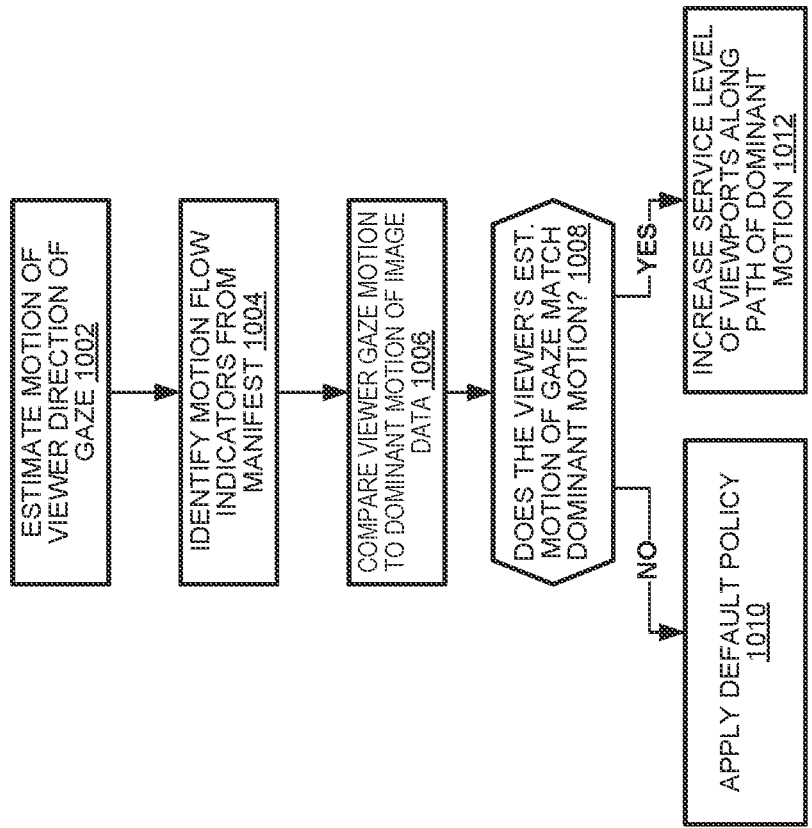
FIG. 10 illustrates a method for predicting a viewport location according to an aspect of the present disclosure.

FIG. 10 illustrates a method for predicting a viewport location according to an aspect of the present disclosure. In that method, a current viewer's direction of gaze may be estimated (box 1002) while viewing a multi-directional video. The current viewer's estimated motion of gaze may be compared to a dominant motion in the video content (box 1006). If the currently viewer's estimated motion of gaze matches the dominant motion (box 1008), the service level of viewports along the path of dominant motion is increased (box 1012). For example, the tier level for tiles along the path of dominant motion may be increased to higher quality tiers as compared to a default tier selection policy. Alternatively, if the estimated gaze of the viewer's motion does not match the dominant motion, the default tier selection policy may be applied (box 1010).

The motion indicators from the source may, for example, be stored as metadata directly in a manifest of the video, may be embedded in coded video content such as in SEI messages, or may be communicated separately such as in a data segment of motion information at a location listed in a manifest separate from locations of coded video data. The motion indication itself may be, for example, an estimate of optical flow in the video, or may simply be an indication of an average dominant motion. For example motion in the content of the video may be determined from motion vectors in the coded video in a region around the gaze location, or from metadata indicating motion such as metadata created from content analysis of the video. In an aspect, the content motion that is compared to a gaze direction may be dominant motion in the region of the gaze location. In other aspects, the content motion may be a global motion of a larger portion or the entire frame of the source video.

Figure 11:
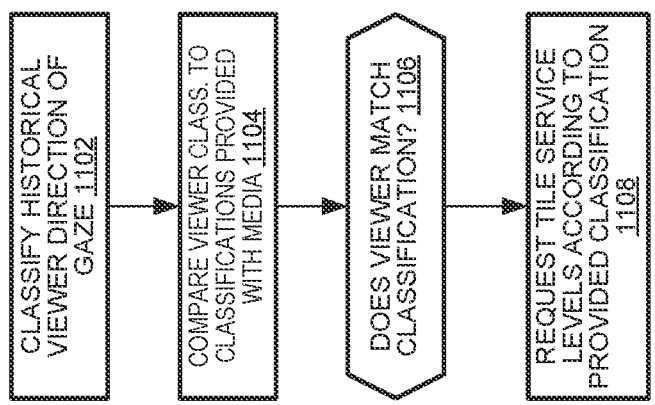
FIG. 11 illustrates a method for predicting a viewport location according to an aspect of the present disclosure.

FIG. 11 illustrates a method for predicting a viewport location according to an aspect of the present disclosure. Prior viewer's direction of gaze may be classified (box 1102), and compared to a current user's classification of gaze direction (box 1104). If a currently viewer's classification matches a classification of prior viewers (box 1104), then tile service levels may be requested according to the provided classification (box 1106).

Prior viewer's data, including classification of prior viewer's direction of gaze, may be provided with the coded media, for example, as metadata in a manifest, as embedded in coded media such as in SEI messages, or as a separate data segment pointed to by the manifest for the media.

Tile Bit Allocation

FIG. 12 illustrates a system 1200 for coding tiled video according to an aspect of the present disclosure. The system of FIG. 12 includes image processor 1202, video formatter 1204, and video coder 1204. FIG. 12 also includes optional elements storage 1208 and prediction processor 1210. A multi-directional source video may be provided as input to both the image processor 1202 and the video formatter 1204. The video formatter 1204 may convert the multi-directional source video from a source format, such as the formats of FIGS. 19-21, into spatial tiles of time chunks, for example as explained herein regarding FIG. 3. Hence image formatter 1204 may output tiles of video for a time chunk to be compressed by video coder 1206. In some aspects video coder 1206 may code tiles within a chunk independently of each other. A chunk of video corresponds to a portion of video over a period of time. In some aspects, a chunk may correspond to a number of frame times of a source video; in other aspects, a chunk may correspond to a single frame of source video. Image processor 1202 processes the input video to produce a tile bit allocation for a chunk of video which may include an allocation of a bit budget (or bandwidth limit) across the tiles for the chunk. For example, image processor 1202 may select a tile bit allocation that may provide an visual quality that is similar across tiles as measured by a quality metric. Video coder 1206 may code tiles of a chunk according to the bit allocations determined by image processor 1202. For example, video coder 1206 may use quantization parameters based upon a tile bit allocation from image processor 1202 to code the data segments of tiles that are temporally co-located with each other.

Optional storage 1208 may store coded tiles of chunks of multi-directional video, for example as depicted in FIG. 4. In an aspect, the coded tiles of chunks in storage 1208 may be indexed in a manifest file as depicted in FIG. 18 to facilitate later retrieval. Storage 1208 may reside on a networked server capable of responding to requests for the stored coded tiles of chunks.

Optional prediction processor 1210 may determine viewer prediction information to be used at a terminal that receives or renders the coded multi-directional video to predict a likely location of a viewport for a viewer. Prediction information may include data from other viewers of the same multi-directional source video, data about the image content of the multi-directional source video, and/or information derived from one or both other viewer's data and image content. For example, image processor 1202 may perform image analysis to detect objects and optical flow, and may provide the location and motion of detected objects to prediction processor 1210. For example, prediction processor 1210 may collect data about previous users' viewing of the multi-directional source video, including the viewport location for the other users for each chunk of video, or the other viewer's eye gaze may be tracked during presentation of the multi-directional source video. In some cases the other viewers may be grouped into classes, such as classes defined by demographic data or classes defined by the detected objects that a viewer's gaze tracks when watching the source video. In another example, viewer prediction information may include a viewport location determined by an artistic director of the multi-source video as the preferred viewport that contains, for example, the intended primary subject of the multi-directional source video.

In an aspect (not depicted), viewer prediction information may be embedded into coded video. For example, HEVC and other video coding standards may provide metadata mechanisms, such as supplemental enhancement information (SEI) messages, that may be used to describe a preferred viewport location.

In an aspect, visual quality may be measured by a quality metric such as a subjective perceptual image quality metric or objective image quality metric, such as MSE, PSNR, VMAF, SSIM, or VQM. In an aspect, a target for a quality metric may be identified, a tile may be coded and decoded to measure an actual quality metric value. If the measured actual quality metric is not sufficiently close to the target quality metric, coding parameters may be adjusted and the tile can be recoded using the adjusted parameters until the target is achieved.

In an aspect, coding at a quality metric may include varying coding parameters to achieve a quality level measured by the quality metric. Such coding parameters that may be varied include changing a quantization parameter, changing quantization thresholding, changing lagrangian lambda parameters, and changing the resolution of source video to be coded.

In an aspect, video coder 1206 may create tiles of source video according to a multi-tiered coding protocol, and the tile bit allocation produced by image processor 1202 may include a bit allocation for multiple tiers of each tile in a chunk. All tiers for all chunks specified in the bit allocation may be coded and stored in storage 1208, and described with a manifest for later use such as streaming from a server.

Figure 14:
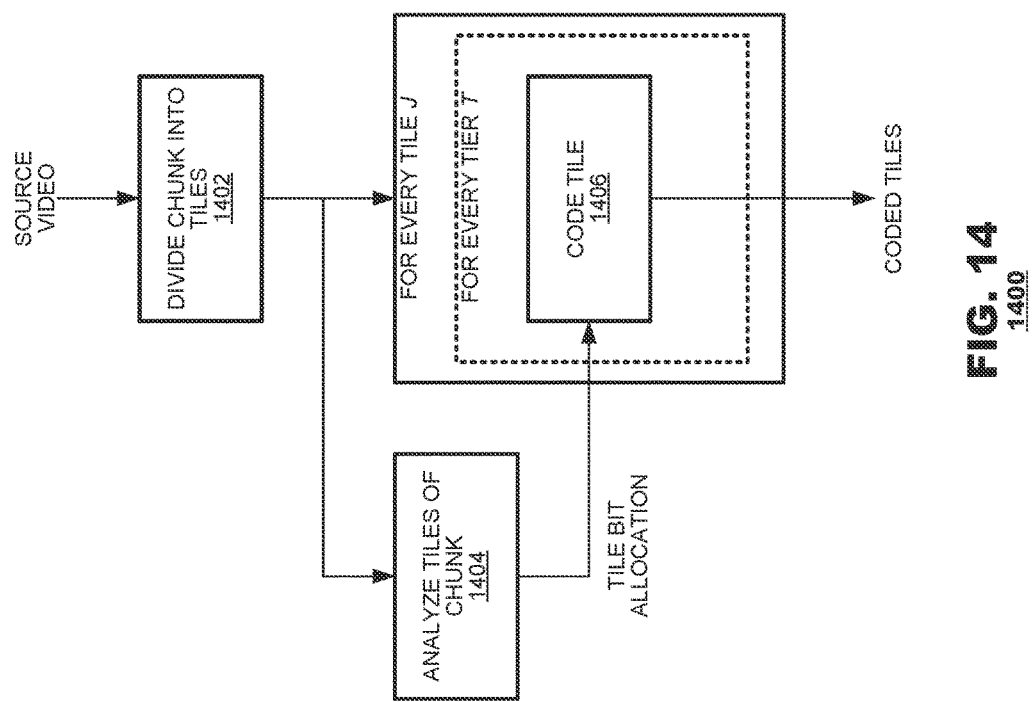
FIG. 14 illustrates method for coding tiles of a source video according to an aspect of the present disclosure.

FIG. 14 illustrates a method 1400 for coding tiles of a source video according to an aspect of the present disclosure. A time chunk of multi-directional source video may be divided into spatial tiles (box 1402), which are analyzed (box 1404) and coded (box 1406). Analysis of the tiles in a chunk (box 1402) may produce a tile bit allocation, for example as in the image processor box 1202 of FIG. 12. Every tile j of the chunk may be coded (box 1406) according to the tile bit allocation.

Coding of video according to tile bit allocations as depicted in FIGS. 12 and 14 may solve problems caused by tiled source video, such a video divided into tiles as depicted in FIG. 3. For example, an image of video data often does not include uniform density of information spatially throughout a frame of video. Tiles of an image filled with smooth sky may be much easier to compress than tiles containing objects on the ground that have detailed texture or complex motion. Storage capacity or transmission bandwidth limits on compressed video may dictate a maximum number of bits $B^k$ for the compressed chunk k. A simple division of $B^k$ bits allocated uniformly to each tile may result in a high-quality compression of tiles that are simpler to compress, and lower-quality compression of tiles that are harder to compress. Such non-uniform compression quality may be perceived visually by a viewer as visual artifacts at the edges of rendered tiles.

In an aspect, an improvement over uniform distribution of bit budget across all tiles may include allocating bits based on a weighting of tiles, where the weighting of a particular tile in a particular chunk may be determined based on the image content of all tiles in the chunk by image processor 1202. For example, weights $w^k_j$ for tiles j of chunk k may be based on the image content of chunks k, and may be used to determine a tile bit allocation $$b^k_j = B^k * w^k_j \qquad \text{(Eq. 1)}$$

where $b^k_j$ is the tile bit allocation for a tile j of a chunk k and $B^k$ is the total bit budget for all tiles of chunk k.

In an aspect, video coder 1206 may use tiles of source video according to a multi-tiered coding protocol, and the tile bit allocation produced by image processor 1202 may be a tier-tile bit allocation that includes a bit allocation for multiple tiers for individual tiles in a chunk. For example, a tier-tile bit allocation $b^k_j(t)$ amongst tiles j and tiers t of a chunk k may be determined as:

$$b^k_j(t) = B^k(t) * w^k_j \qquad \text{(Eq. 2)}$$

where the total bit budget for each tier t of a chunk k is $B^k(t)$. Again, the weights $w^k_j$ may be determined based on image content analysis of the tiles of chunk k. The tile coding (box 1406) may then include coding the tiles of the first chunk in tiers according to the tier-tile bit allocation.

Tile and Tier Selection

FIG. 13 illustrates a system 1300 for selecting tiles and tiers from a pre-coded video stream for a viewport location according to an aspect of the present disclosure. The system of FIG. 13 includes tile and tier selector 1302 and video decoder 1304. Based on current viewport location, a tile and tier selector 1302 may select a tier collection specifying which tiers and tiles of a current chunk are to be requested from a coded multi-directional video, for example from storage 1208 of FIG. 12. Video data for the current viewport location (which may be a subset of the data specified in the tier collection and hence may be a subset of the video data received from storage 1208) may be decoded by video decoder 1304 to produce decoded video of the tiles containing the current viewport. Optional viewport cropper 1306 may combine and crop the decoded tiles to the actual shape of a viewport to produce a decoded viewport image. Optional viewport predictor 1310 may produce predicted viewport locations based on the current viewport location and view prediction information received from the coded multi-directional video source. In an aspect (not depicted) view prediction information may be embedded in the coded video data, such as in the SEI messages of the HEVC video coding standard.

Figure 15:
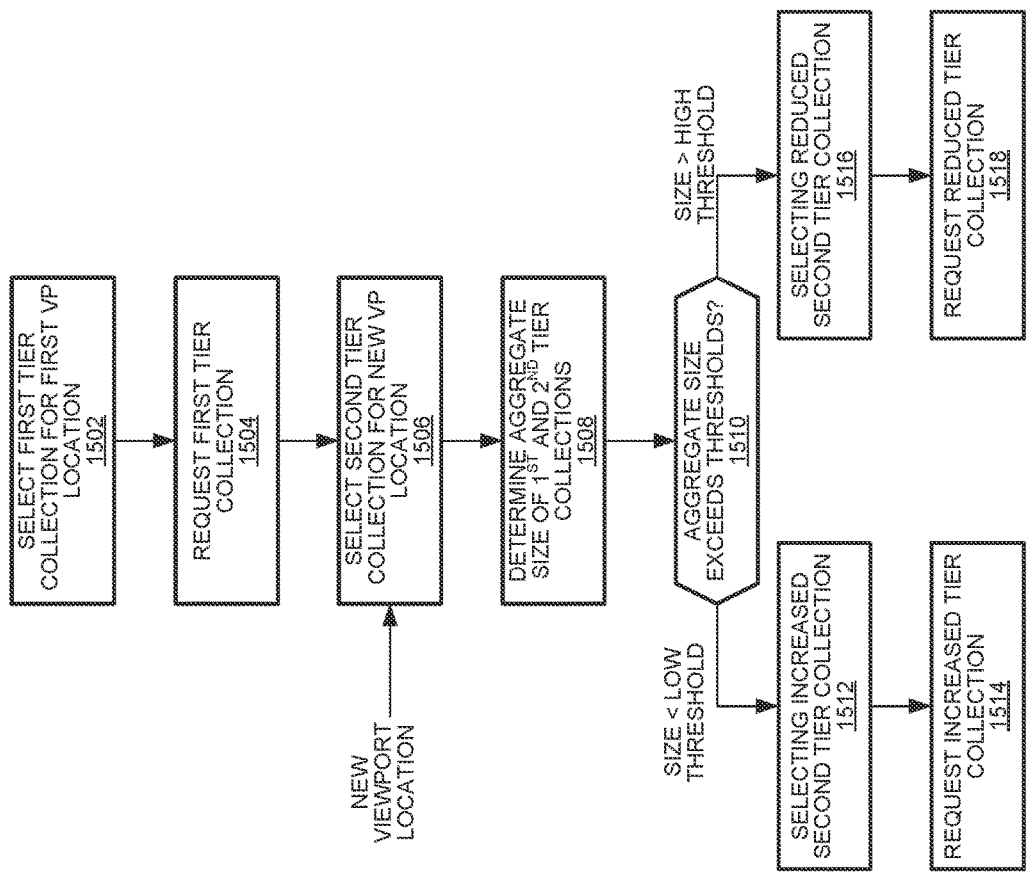
FIG. 15 illustrates a method for selecting tiers for tiles of a source video when a viewport moves according to an aspect of the present disclosure.

FIG. 15 illustrates a method 1500 for selecting tiers for tiles of a source video when a viewport moves according to an aspect of the present disclosure. As depicted in FIG. 15, a first tier collection is selected for a first viewport location (box 1502), and a request for a transmission of the first tier collection is issued (box 1504). A second tier collection is then selected for a new viewport location (box 1506). Before requesting the second viewport location, an aggregate size of compressed video data for the combination of the first and second tier collection is determined (box 1508). If the aggregate size exceeds a high threshold, a reduced second tier collection is selected (box 1516) and requested (box 1518). Alternately, if the aggregate size is below a low threshold, an increased second tier collection is selected (box 1512) and requested (box 1514).

A tier collection may include a list of tiles and corresponding tiers, and selection of a tier collection may be done, for example by tile and tier selector 1302 of FIG. 13. If a viewport moves from the first viewport location after transmission of the first tier collection is started for a chunk, it may be desirable to adjust the tier collection before rendering the next chunk. For example, when the tiles of the new viewport location are at a lower quality tier or not requested at all in the first tier collection, it may be desirable to have higher quality rendering for the new viewport location without waiting until the next chunk. However, a request for transmission of a second tier collection for the new viewport location may exceed a bandwidth threshold. When a threshold is exceeded, the tiers in the second tier collection can be increased or reduced as necessary to meet an aggregate size threshold.

In an aspect, the number of thresholds compared to the aggregate size of a tier collection may vary. For example, multiple high thresholds may be used to reduce the aggregate size in different ways. For example if a first high threshold is exceeded, the tier levels may be reduced for only one of the viewport tiles and non-viewport tiles, while if a second high threshold, higher than the first high threshold, is exceeded, the tier levels may be reduced for both the viewport tiles and non-viewport tiles. Similarly, if a first low threshold is exceeded, the tier levels may be increased for only one of the viewport tiles and non-viewport tiles, while if a second low threshold, lower than the first low threshold, is exceeded, the tier levels may be increased for both the viewport tiles and non-viewport tiles.

In an aspect, the aggregate compressed size of a tier collection can be changed by increasing or decreasing the tiers level used by viewport tiles. In another aspect, the size of a tier collection can be changed by increasing or decreasing the number of tiers between viewport tiles and non-viewport tiles. For example, a default selection for tier collection might be to choose a constant viewport tier for viewport tiles, and a constant non-viewport tier for non-viewport tiles, where the non-viewport tier is less than the viewport tier. In this case, a reduced tier collation can be selected by increasing the difference between the viewport tier and non-viewport tier. Alternately, an increased tier collection can be selected by reducing the number of tiers between the viewport tier and the non-viewport tier.

In an aspect, a request for a tier collection may include a request for transmission of an encoded data segments from locations specified in manifest file for a multi-directional video. For example, tiles of a multi-directional video may be pre-encoded at multiple tiers, and the tiers and tiles may be described in a manifest file, for example as in FIGS. 4 and 18. A receiving or rendering device may request a tier collection by requesting the segments from locations listed in a manifest.

Coding and Decoding of Tiles

FIG. 16 is a functional block diagram of a coding system 1600 according to an aspect of the present disclosure. The system 1600 may include an image source 1610, an image processing system 1620, a video coder 1630, a video decoder 1640, a reference picture store 1650 and a predictor 1660. The image source 1610 may generate image data as a multi-directional image, containing image data of a field of view that extends around a reference point in multiple directions. The image processing system 1620 may perform image processing operations to condition the image for coding. In one aspect, the image processing system 1620 may generate different versions of source data to facilitate encoding the source data into multiple layers of coded data. For example, image processing system 1620 may generate multiple different projections of source video aggregated from multiple cameras. In another example, image processing system 1620 may generate resolutions of source video for a high layer with a higher spatial resolution and a lower layer with a lower spatial resolution. The video coder 1630 may generate a multi-layered coded representation of its input image data, typically by exploiting spatial and/or temporal redundancies in the image data. The video coder 1630 may output a coded representation of the input data that consumes less bandwidth than the original source video when transmitted and/or stored. Video coder 1630 may output data in discrete time chunks corresponding to a temporal portion of source image data, and in some aspects, separate time chunks encoded data may be decoded independently of other time chunks. Video coder 1630 may also output data in discrete layers, and in some aspects, separate layers may be transmitted independently of other layers.

The video decoder 1640 may invert coding operations performed by the video encoder 1630 to obtain a reconstructed picture from the coded video data. Typically, the coding processes applied by the video coder 1630 are lossy processes, which cause the reconstructed picture to possess various differences when compared to the original picture. The video decoder 1640 may reconstruct pictures of select coded pictures, which are designated as "reference pictures," and store the decoded reference pictures in the reference picture store 1650. In the absence of transmission errors, the decoded reference pictures may replicate decoded reference pictures obtained by a decoder (not shown in FIG. 16).

The predictor 1660 may select prediction references for new input pictures as they are coded. For each portion of the input picture being coded (called a "pixel block" for convenience), the predictor 1660 may select a coding mode and identify a portion of a reference picture that may serve as a prediction reference search for the pixel block being coded. The coding mode may be an intra-coding mode, in which case the prediction reference may be drawn from a previously-coded (and decoded) portion of the picture being coded.

Alternatively, the coding mode may be an inter-coding mode, in which case the prediction reference may be drawn from one or more previously-coded and decoded picture. In one aspect of layered coding, prediction references may be pixel blocks previously decoded from another layer, typically a lower layer, lower than the layer currently being encoded. In the case of two layers that encode two different projections formats of multi-directional video, a function such as an image warp function may be applied to a reference image in one projection format at a first layer to predict a pixel block in a different projection format at a second layer.

In another aspect of a layered coding system, a differentially coded enhancement layer may be coded with restricted prediction references to enable seeking or layer/tier switching into the middle of an encoded enhancement layer chunk. In a first aspect, predictor 1660 may restrict prediction references of every frame in an enhancement layer to be frames of a base layer or other lower layer. When every frame of an enhancement layer is predicted without reference to other frames of the enhancement layer, a decoder may switch to the enhancement layer at any frame efficiently because previous enhancement layer frames will never be necessary to reference as a prediction reference. In a second aspect, predictor 1660 may require that every Nth frame (such as every other frame) within a chuck be predicted only from a base layer or other lower layer to enable seeking to every Nth frame within an encoded data chunk.

When an appropriate prediction reference is identified, the predictor 1660 may furnish the prediction data to the video coder 1630. The video coder 1630 may code input video data differentially with respect to prediction data furnished by the predictor 1660. Typically, prediction operations and the differential coding operate on a pixel block-by-pixel block basis. Prediction residuals, which represent pixel-wise differences between the input pixel blocks and the prediction pixel blocks, may be subject to further coding operations to reduce bandwidth further.

As indicated, the coded video data output by the video coder 1630 should consume less bandwidth than the input data when transmitted and/or stored. The coding system 1600 may output the coded video data to an output device, such as a transceiver 1670, that may transmit the coded video data across a communication network 130 (FIG. 1). Alternatively, the coding system 1600 may output coded data to a storage device (not shown) such as an electronic-, magnetic- and/or optical storage medium.

The transceiver 1670 also may receive viewport information from a decoding terminal (FIG. 17) and provide the viewport information to controller 1680. Controller 1680 may control the image processor 1620, the video coding process overall, including video coder 1630 and transceiver 1670. Viewport information received by transceiver 1670 may include a viewport location and/or a preferred projection format. In one aspect, controller 1680 may control transceiver 1670 based on viewport information to send certain coded layer(s) for certain spatial tiles, while sending a different coded layer(s) for other tiles. In another aspect, controller 1680 may control the allowable prediction references in certain frames of certain layers. In yet another aspect, controller 1680 may control the projection format(s) or scaled layers produced by image processor 1630 based on the received viewport information.

FIG. 17 is a functional block diagram of a decoding system 1700 according to an aspect of the present disclosure. The decoding system 1700 may include a transceiver 1710, a buffer 1715, a video decoder 1720, an image processor 1730, a video sink 1740, a reference picture store 1750, a predictor 1760, and a controller 1770. The transceiver 1710 may receive coded video data from a channel and route it to buffer 1715 before sending it to video decoder 1720. The coded video data may be organized into chunks of time and spatial tiles, and may include different coded layers for different tiles. The video data buffered in buffer 1715 may span the video time of multiple chunks. The video decoder 1720 may decode the coded video data with reference to prediction data supplied by the predictor 1760. The video decoder 1720 may output decoded video data in a representation determined by a source image processor (such as image processor 1620 of FIG. 16) of a coding system that generated the coded video. The image processor 1730 may extract video data from the decoded video according to the viewport orientation currently in force at the decoding system. The image processor 1730 may output the extracted viewport data to the video sink device 1740. Controller 1770 may control the image processor 1730, the video decoding processes including video decoder 1720, and transceiver 1710.

The video sink 1740, as indicated, may consume decoded video generated by the decoding system 1700. Video sinks 1740 may be embodied by, for example, display devices that render decoded video. In other applications, video sinks 1740 may be embodied by computer applications, for example, gaming applications, virtual reality applications, and/or video editing applications, that integrate the decoded video into their content. In some applications, a video sink may process the entire multi-directional field of view of the decoded video for its application but, in other applications, a video sink 1740 may process a selected sub-set of content from the decoded video. For example, when rendering decoded video on a flat panel display, it may be sufficient to display only a selected subset of the multi-directional video. In another application, decoded video may be rendered in a multi-directional format, for example, in a planetarium.

The transceiver 1710 also may send viewport information provided by the controller 1770, such as a viewport location and/or a preferred projection format, to the source of encoded video, such as terminal 1600 of FIG. 16. When the viewport location changes, controller 1770 may provide new viewport information to transceiver 1710 to send on to the encoded video source. In response to the new viewport information, missing layers for certain previously received but not yet decoded tiles of encoded video may be received by transceiver 1710 and stored in buffer 1715. Decoder 1720 may then decode these tiles using these replacement layers (which were previously missing) instead of the layers that had previously been received based on the old viewport location.

Controller 1770 may determine viewport information based on a viewport location. In one example, the viewport information may include just a viewport location, and the encoded video source may then use the location to identify which encoded layers to provide to decoding system 1700 for specific spatial tiles. In another example, viewport information sent from the decoding system may include specific requests for specific layers of specific tiles, leaving much of the viewport location mapping in the decoding system. In yet another example, viewport information may include a request for a particular projection format based on the viewport location.

The principles of the present disclosure find application with a variety of projection formats of multi-directional images. In an aspect, one may convert between the various projection formats of FIGS. 14-16 using a suitable projection conversion function.

FIG. 18 is a simplified block diagram of an example video distribution system 1800 suitable for use with the present invention, including when multi-directional video is pre-encoded and stored on a server. The system 1800 may include a distribution server system 1810 and a client device 1820 connected via a communication network 1830. The distribution system 1800 may provide coded multi-directional video data to the client 1820 in response to client requests. The client 1820 may decode the coded video data and render it on a display.

The distribution server 1810 may include a storage system 1840 on which pre-encoded multi-directional videos are stored in a variety of tiers for download by the client device 1820. The distribution server 1810 may store several coded representations of a video content item, shown as tiers 1, 2, and 3, which have been coded with different coding parameters. The video content item includes a manifest file containing pointers to chunks of encoded video data for each tier.

In the example of FIG. 18, the Tiers 1 and 2 differ by average bit rate, with Tier 2 enabling a higher quality reconstruction of the video content item at a higher average bitrate compared to that provided by Tier 1. The difference in bitrate and quality may be induced by differences in coding parameters—e.g., coding complexity, frame rates, frame size and the like. Tier 3 may be an enhancement layer of Tier 1, which, when decoded in combination with Tier 1, may improve the quality of the Tier 1 representation if it were decoded by itself. Each video tier 1-3 may be parsed into a plurality of chunks CH1.1-CH1.N, CH2.1-CH2.N, and CH3.1-CH3.N. Manifest file 1850 may include pointers to each chunk of encoded video data for each tier. The different chunks may be retrieved from storage and delivered to the client 1820 over a channel defined in the network 1830. Channel stream 1840 represents aggregation of transmitted chunks from multiple tiers. Furthermore, as explained above with regard to FIG. 4, a multi-directional video may be spatially segmented into tiles. FIG. 18 depicts the chunks available for the various tiers of one tile. Manifest 1850 may additionally include other tiles (not depicted in FIG. 18), such as by providing metadata and pointers to multiple tiers including storage locations encoded data chunks for each of the various tiers.

In some aspect, all tiers may not be encoded for all chunks. In the example of FIG. 18, every tier is encoded for every chunk. However, in some aspects, only a subset of tiers may be encoded for one or more chunks. For example, for a video with low motion and low spatial variation, it is possible that a whole chunk (or a tile of a chunk) may be encoded at very high quality at within the bitrate of the lowest tier. In another example, an intermediate tier may not be encoded for every tile of a chunk.

The example of FIG. 18 illustrates three encoded video tiers 1, 2, and 3 for one tile, each tier coded into N chunks (1 to N) with different coding parameters. Although not required, this example illustrates the chunks of each tier as temporally-aligned so that chunk boundaries define respective time periods ($t_1, t_2, t_3, \ldots, t_N$) of video content. Chunk boundaries may provide preferred points for stream switching between the tiers. Stream switching may be facilitated, for example, by resetting motion prediction coding state at switching points.

In an aspect, multi-directional image data may include depth maps and/or occlusion information. Depth maps and/or occlusion information may be included as separate channel(s) and manifest 1850 may include references to these separate channel(s) for depth maps and/or occlusion information.

Multi-Directional Video Formats

FIG. 19 illustrates an exemplary multi-directional image projection format according to one aspect. The multi-directional image 1930 may be generated by a camera 1910 that pivots along an axis. During operation, the camera 1910 may capture image content as it pivots along a predetermined angular distance 1920 (preferably, a full 360°) and may merge the captured image content into a 360° image. The capture operation may yield a multi-directional image 1930 that represents a multi-directional field of view having been partitioned along a slice 1922 that divides a cylindrical field of view into a two dimensional array of data. In the multi-directional image 1930, pixels on either edge 1932, 1934 of the image 1930 represent adjacent image content even though they appear on different edges of the multi-directional image 1930.

FIG. 20 illustrates an exemplary multi-directional image projection format according to another aspect. In the aspect of FIG. 20, a camera 2010 may possess image sensors 2012-2016 that capture image data in different fields of view from a common reference point. The camera 2010 may output a multi-directional image 2030 in which image content is arranged according to a cubemap capture operation 2020 in which the sensors 2012-2016 capture image data in different fields of view 2021-2026 (typically, six) about the camera 2010. The image data of the different fields of view 2021-2026 may be stitched together according to a cubemap layout 2030. In the example illustrated in FIG. 20, six sub-images corresponding to a left view 2021, a front view 2022, a right view 2023, a back view 2024, a top view 2025 and a bottom view 2026 may be captured, stitched and arranged within the multi-directional picture 2030 according to "seams" of image content between the respective views 2021-2026. Thus, as illustrated in FIG. 20, pixels from the front image 2032 that are adjacent to the pixels from each of the left, the right, the top, and the bottom images 2031, 2033, 2035, 2036 represent image content that is adjacent respectively to content of the adjoining sub-images. Similarly, pixels from the right and back images 2033, 2034 that are adjacent to each other represent adjacent image content. Further, content from a terminal edge 2038 of the back image 2034 is adjacent to content from an opposing terminal edge 2039 of the left image. The image 2030 also may have regions 2037.1-2037.4 that do not belong to any image. The representation illustrated in FIG. 20 often is called a "cubemap" image.

Coding of cubemap images may occur in several ways. In one coding application, the cubemap image 2030 may be coded directly, which includes coding of null regions 2037.1-2037.4 that do not have image content. The encoding techniques of FIG. 14 may be applied to cubemap image 2030.

In other coding applications, the cubemap image 2030 may be repacked to eliminate null regions 2037.1-2037.4 prior to coding, shown as image 2040. The techniques described in FIG. 14 may also be applied to a packed image frame 2040. After decode, the decoded image data may be unpacked prior to display.

FIG. 21 illustrates another exemplary multi-directional projection image format 2130. The frame format of FIG. 21 may be generated by another type of omnidirectional camera 2100, called a panoramic camera. A panoramic camera typically is composed of a pair of fish eye lenses 2112, 2114 and associated imaging devices (not shown), each arranged to capture image data in a hemispherical field of view. Images captured from the hemispherical fields of view may be stitched together to represent image data in a full 360° field of view. For example, FIG. 21 illustrates a multi-directional image 2130 that contains image content 2131, 2132 from the hemispherical views 2122, 2124 of the camera, which are joined at a seam 2135. The techniques described hereinabove also find application with multi-directional image data in such formats 2130.

In an aspect, cameras, such as the cameras 1910, 2010, and 2110 in FIGS. 19-21, may capture depth or occlusion information in addition to visible light. In some cases, depth and occlusion information may be stored as separate data channels of data in multi-projection formats such as images such as 1930, 2030, 2040, and 2130. In other cases, depth and occlusion information may be included as a separate data channel in a manifest, such as manifest 1050 of FIG. 4.

The foregoing discussion has described operation of the aspects of the present disclosure in the context of video coders and decoders. Commonly, these components are provided as electronic devices. Video decoders and/or controllers can be embodied in integrated circuits, such as application specific integrated circuits, field programmable gate arrays and/or digital signal processors. Alternatively, they can be embodied in computer programs that execute on camera devices, personal computers, notebook computers, tablet computers, smartphones or computer servers. Such computer programs include processor instructions and typically are stored in physical storage media such as electronic-, magnetic-, and/or optically-based storage devices, where they are read by a processor and executed. Decoders commonly are packaged in consumer electronics devices, such as smartphones, tablet computers, gaming systems, DVD players, portable media players and the like; and they also can be packaged in consumer software applications such as video games, media players, media editors, and the like. And, of course, these components may be provided as hybrid systems that distribute functionality across dedicated hardware components and programmed general-purpose processors, as desired.

It is well understood that the use of personally identifiable information, such as data about viewers of videos, should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

We claim:

1. A method for streaming video data, comprising:
retrieving content of a multi-directional video from a source device at a first level of service,
estimating, from data representing movement of a display device, a first direction of movement of a gaze location among the multi-directional video content displayed on the display device;
comparing the estimated first direction of movement of gaze location to a hint of a second direction of movement identified by the source device;
when the comparison indicates that the first direction of movement aligns with the second direction of movement, requesting content of a portion of the multi-directional video at a first location along the estimated first direction of movement at a second, higher level of service; and
when the comparison indicates that the first direction of movement is not aligned with the second direction of movement, requesting content of a portion of the multi-directional video at a second location different from the first location at a second level of service.

2. The method of claim 1, wherein the hint of the second direction of movement of determined from a manifest file associated with the multi-directional video.

3. The method of claim 1, wherein the hint of the second direction of movement is determined from a supplemental enhancement information (SEI) message embedded in coded video.

4. The method of claim 1, wherein the hint of the second direction of movement is a hint of a direction of movement of image content.

5. The method of claim 4, wherein the hint of the direction of movement of image content indicates an average dominate motion in a spatial subset region of the multi-directional video.

6. The method of claim 4, wherein the hint of the direction of movement of image content indicates an average dominate motion over an entire frame of the multi-directional video.

7. The method of claim 1, wherein the requesting includes requesting image data for a region corresponding to a present location of a viewport of the display device at a highest service tier.

8. A rendering system, comprising:
a buffer for storing tiles of multi-directional image data;
an image output for rendering a viewport of image contents on a display; and
a controller for:
retrieving content of a multi-directional video from a source device at a first level of service, and storing the retrieved content in the buffer;
estimating, from data representing movement of a display device, a first direction of movement of a gaze location among the multi-directional video content displayed on the display device;
comparing the estimated first direction of movement of gaze location to a hint of a second direction of movement identified by the source device;
when the comparison indicates that the first direction of movement aligns with the second direction of movement, requesting content of a portion of the multi-directional video at a first location along the estimated first direction of movement at a second, higher level of service; and
when the comparison indicates that the estimated first direction of movement is not aligned with the second direction of movement, requesting content of a portion of the multi-directional video at a second location different from the first location at a second level of service.

9. The rendering system of claim 8, wherein the hint of the second direction of movement of determined from a manifest file associated with the multi-directional video.

10. The rendering system of claim 8, wherein the hint of the second direction of movement is determined from a supplemental enhancement information (SEI) message embedded in coded video.

11. The rendering system of claim 8, wherein the hint of the second direction of movement is a hint of a direction of movement of image content.

12. The rendering system of claim 11, wherein the hint of the direction of movement of image content indicates an average dominate motion in a spatial subset region of the multi-directional video.

13. The rendering system of claim 11, wherein the hint of the direction of movement of image content indicates an average dominate motion over an entire frame of the multi-directional video.

14. A non-transitory storage medium including instructions that, when executed by a processor, cause:
- retrieving content of a multi-directional video from a source device at a first level of service,
- estimating, from data representing movement of a display device, a first direction of movement of a gaze location among the multi-directional video content displayed on the display device;
- comparing the estimated first direction of movement of gaze location to a hint of a second direction of movement identified by the source device;
- when the comparison indicates that the first direction of movement aligns with the second direction of movement, requesting content of a portion of the multi-directional video at a first location along the estimated first direction of movement at a second, higher level of service; and
- when the comparison indicates that the first direction of movement is not aligned with the second direction of movement, requesting content of a portion of the multi-directional video at a second location different from the first location at a second level of service.

15. The non-transitory storage medium of claim 14, wherein the hint of the second direction of movement of determined from a manifest file associated with the multi-directional video.

16. The non-transitory storage medium of claim 14, wherein the hint of the second direction of movement is determined from a supplemental enhancement information (SEI) message embedded in coded video.

17. The non-transitory storage medium of claim 14, wherein the hint of the second direction of movement is a hint of a direction of movement of image content.

18. The non-transitory storage medium of claim 17, wherein the hint of the direction of movement of image content indicates an average dominate motion in a spatial subset region of the multi-directional video.

* * * * *